UNITED STATES PATENT OFFICE.

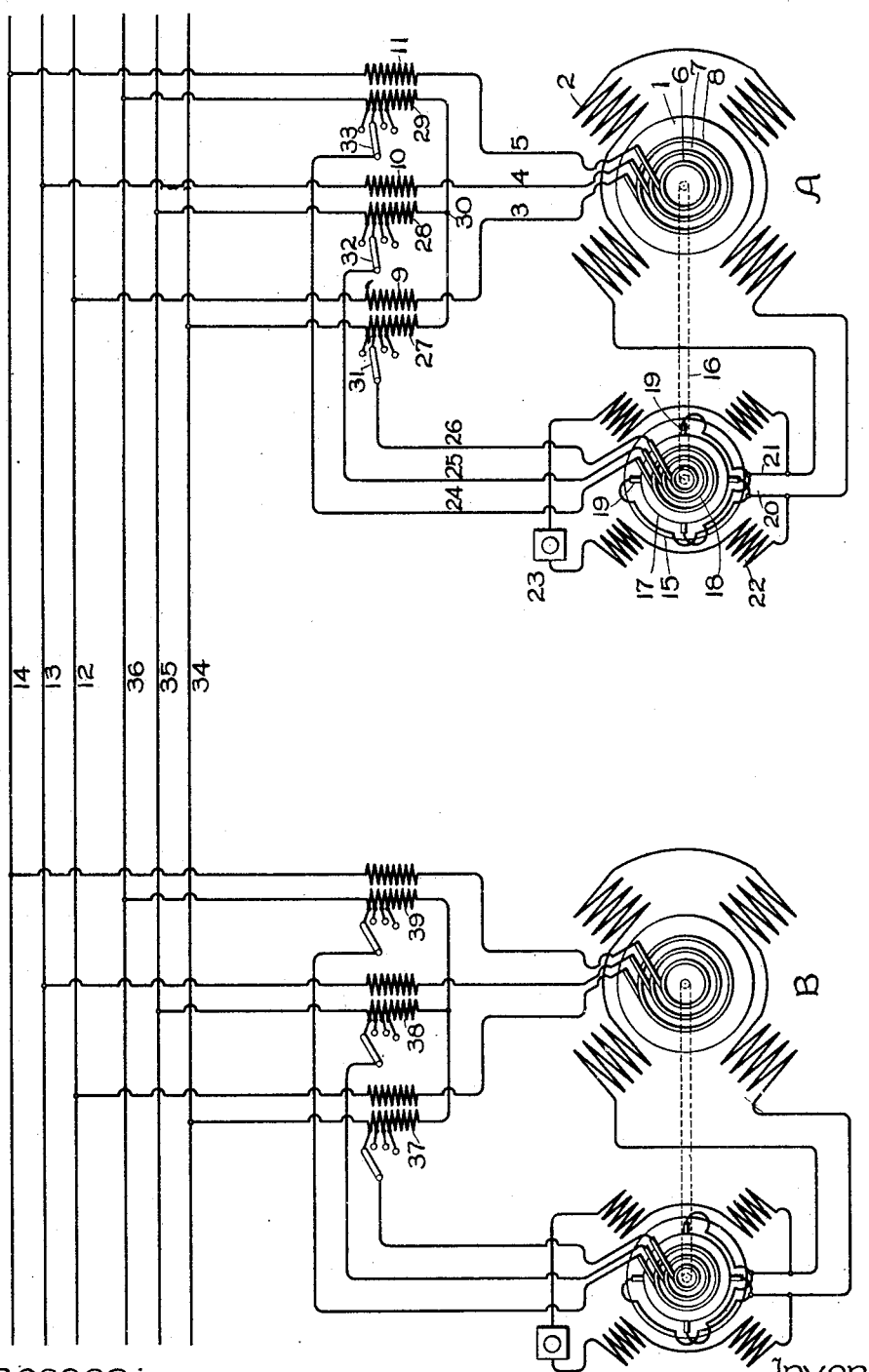

WILLIAM L. R. EMMET, OF SCHENECTADY, NEW YORK, ASSIGNOR TO THE GENERAL ELECTRIC COMPANY, OF NEW YORK.

OPERATING DYNAMO-ELECTRIC MACHINES.

SPECIFICATION forming part of Letters Patent No. 664,077, dated December 18, 1900.

Application filed June 29, 1900. Serial No. 22,016. (No model.)

*To all whom it may concern:*

Be it known that I, WILLIAM L. R. EMMET, a citizen of the United States, residing at Schenectady, county of Schenectady, State of New York, have invented certain new and useful Improvements in Operating Dynamo-Electric Machines, (Case No. 1,484,) of which the following is a specification.

In practice it has been found almost impossible to operate self-regulating alternating-current generators in parallel unless some special adjunctive devices be employed. This is particularly true of the type of generator shown in the patent to E. W. Rice, Jr., No. 595,412, dated December 14, 1897. As this type of alternator is ordinarily manufactured the exciter-armature is mounted on the same shaft with the rotating member of the alternator, and the combination as a whole is known generally as a "compensated alternator." In this type of alternator, as is well known, the field strength is automatically varied in response to variation of leading or lagging current supplied by the machine, and it is this feature of automatic regulation which gives rise to the difficulty heretofore referred to. When such machines are connected in parallel with each other, there will be, as is usual in such cases, a greater or less exchange of idle current between the machines. Owing to the fact that the machines automatically alter their field strength in response to the idle current flowing, it has been found that when the machines are thrown in parallel the field of one machine will automatically increase in strength while that of another will decrease, and in some cases this action may go on to such an extent as to entirely extinguish the field of one of the machines, thereby causing enormous idle currents to flow between the machines, which in some instances may throw the machine entirely out of action by reason of the enormous load due to the short circuit which one machine practically affords for another. I have found that objections of this character can be entirely obviated by rendering the compounding effect of each of the machines dependent upon that of every other.

My invention may be carried out in a number of different ways; but in the drawings and in the following description of the same I have represented one means which I have found particularly effective.

Briefly speaking, it consists, in its specific form, of the use of equalizers connecting together the regulating series transformers inserted in the mains of each alternator.

In the drawings I have for convenience shown but two compensated alternators connected in multiple in accordance with my invention; but it is to be understood that the number of machines may be extended indefinitely. At one side of the sheet of drawings I have shown a compensated alternator A and at the opposite side a similar machine B. The alternator A consists in this particular case of a main armature 1, mounted so as to revolve relatively to the field-magnets, the windings of which are shown at 2. Leads 3, 4, and 5 are connected through suitable brushes to collector-rings 6 7 8, mounted on the armature-shaft. These leads 3 4 5 are connected, respectively, in series with the primary windings 9, 10, and 11 of three series transformers. The continuations of the leads 3 4 5 extend from the opposite ends of the primaries of the series transformers and are connected to the bus-bars 12 13 14, as will readily be seen from the drawings.

On the same shaft with the main alternator is mounted the exciter-armature 15, this connection being conventionally represented by the dotted lines 16, connecting the respective armatures. The armature-winding of the exciter is provided both with a commutator (indicated at 17) and with collector-rings, (indicated collectively at 18.) In this instance there are three collector-rings, and these are connected to points in the armature-winding of the exciter separated from each other by one-third of the polar pitch, so as to constitute a three-phase connection corresponding with the phase of the current generated by the main alternator.

Brushes 19 bear upon the commutator in the ordinary manner and are cross-connected and lead to terminals 20 and 21, from which current is supplied both to the exciter-field 22 and to the main armature-field 2. For the purpose of hand regulation a rheostat 23 may be inserted in series in the exciter-field.

The collector-rings of the exciter are connected to leads 24 25 26, which extend to and are connected with the secondaries of the series transformers placed in series with the leads 3 4 5 of the main alternator. These secondaries are indicated at 27, 28, and 29 and in the present instance are star-connected by means of conductors leading to a common point 30. From the free ends of each secondary extend a series of taps which by means of a switch-arm, plug connection, or other suitable device may be individually connected to corresponding leads 24 to 26 of the regulating-circuit, as shown. In the drawings I have indicated switch-arms 31 32 33 as typical of some suitable mode of action, these switch-arms being joined to the leads 24 to 26, respectively. The switch-arm 31 is adapted to make connection with any of the taps extending from the secondary 27, while in the same manner the switch-arms 32 33 may make corresponding connections with the taps extending from the secondaries 28 and 29. The different positions of the respective switch-arms correspond to different degrees of compounding.

The free end of each secondary 27 to 29, inclusive, is connected directly to corresponding equalizing-conductors, (shown at 34, 35, and 36,) these equalizing-conductors being connected with similar secondary windings of series transformers connected with their primaries in the leads of the alternator B. This latter alternator is, or at least may be, precisely similar to the alternator A, for which reason it is unnecessary to describe its parts in detail. It will be sufficient, however, to call attention to the fact that the leads to the exciter may be connected to points in the secondaries 37 38 39 different from those corresponding with the connections in the case of the alternator A. This may be found necessary in order to separately regulate the compounding effect of the individual machines as may be required by reason of different magnetic characteristics or the like, though ordinarily it will be found that corresponding connections for different sets of secondaries correspond to equal compounding effects for the respective alternators. Moreover, the points of connection of the equalizers may be adjusted, the exciter-leads remaining fixed. This adjusts the interchange of idle current between the machines, at the same time varying the relative compounding effects of the exciters. Ordinarily, however, the equalizer connections are fixed and are so shown in the drawings.

By the use of equalizers such as I have described it will be evident that the compounding effect in one alternator will effect all of the other alternators, thus preventing an excess of field variation in one alternator from taking place without at the same time causing a corresponding variation in the other alternator or alternators. The compounding effect in each machine thus rises or falls with that of the other machines, thus effectually preventing the instability of operation heretofore briefly referred to.

It will be obvious to those skilled in the art that many variations may be made in the application of my invention without departing from its spirit, for which reason I desire that my claims should not be limited to the specific apparatus shown.

What I claim as new, and desire to secure by Letters Patent of the United States, is—

1. The combination of self-regulating alternators, and equalizing-conductors connected to windings inductively related to the leads of said alternators.

2. The combination of alternators, synchronously-driven exciters, series transformers in the leads of the alternators, leads extending from the secondaries of the transformers to the armatures of the exciters, and equalizing-conductors connecting corresponding secondaries.

3. The combination with alternators each provided with means for regulation in response to variation of power factor of current supplied thereby, of means for rendering the regulating action of the several machines dependent.

4. The combination with alternators each provided with means for regulation in response to variation of power factor of current supplied thereby, of means for rendering the regulating action of the several machines dependent, and means for adjusting the regulating action of one or more of the alternators.

5. The combination of self-regulating alternators connected in multiple, and equalizing-conductors for securing dependent regulation of the alternators, said conductors being arranged to carry current derived inductively from said alternators.

6. The combination of alternators, synchronously-driven exciters, series transformers in the leads of the alternators, leads extending from the secondaries of the transformers to the armatures of the exciters, means for adjusting the points of connection of the secondaries and the leads connected thereto, and equalizing-conductors connecting the secondaries.

In witness whereof I have hereunto set my hand this 27th day of June, 1900.

WILLIAM L. R. EMMET.

Witnesses:
  BENJAMIN B. HULL,
  MASEL H. EMERSON.